United States Patent [19]

Lefebvre et al.

[11] Patent Number: 4,943,352
[45] Date of Patent: Jul. 24, 1990

[54] OIL RECLAMATION DEVICE

[75] Inventors: Byron Lefebvre, Lauderhill; Jelle P. Schoen, Fort Lauderdale, both of Fla.

[73] Assignee: Purifiner Manufacturing Company, Rosemont, Ill.

[21] Appl. No.: 202,248

[22] Filed: Jun. 6, 1988

Related U.S. Application Data

[63] Continuation-in-part of Ser. No. 61,823, Jun. 15, 1987, abandoned.

[51] Int. Cl.⁵ .................. B01D 27/08; B01D 35/18
[52] U.S. Cl. .................. 196/46.1; 196/115; 196/121; 196/128; 210/180; 210/184; 210/436; 210/439; 210/444
[58] Field of Search .......... 196/46.1, 115, 121, 196/128; 210/180, 184, 436, 438, 439, 440, 443, 444

[56] References Cited

U.S. PATENT DOCUMENTS

| 1,718,800 | 6/1929 | Rea | |
|---|---|---|---|
| 2,839,196 | 6/1958 | Schwalge | 210/180 |
| 3,756,412 | 9/1973 | Barrow | 210/180 |
| 3,912,631 | 10/1975 | Turman | 210/439 |
| 4,066,559 | 1/1978 | Rohde | 252/10 |
| 4,146,475 | 3/1979 | Forsland | 210/180 |
| 4,189,351 | 2/1980 | Engel | 196/115 |
| 4,227,969 | 10/1980 | Engel | 196/115 |
| 4,289,583 | 9/1981 | Engle | 196/115 |
| 4,297,212 | 10/1981 | Padgett | 210/439 |
| 4,349,438 | 9/1982 | Sims | 210/180 |
| 4,354,946 | 10/1982 | Warlick | 210/774 |
| 4,369,110 | 1/1983 | Picek | 196/46.1 |

FOREIGN PATENT DOCUMENTS 2156145  11/1971  Fed. Rep. of Germany .

Primary Examiner—Joye L. Woodard
Attorney, Agent, or Firm—John S. Hale

[57] ABSTRACT

An oil reclamation device comprising an evaporator plate secured to an evaporator head to form an evaporation chamber which is heated by a heating element mounted in the evaporator head. A spin on filter assembly with an integral oil dispenser tube is removably mounted to the evaporator plate. The evaporator plate is provided with an oil inlet to receive oil to be reclaimed and an oil outlet to discharge reconditioned oil which has passed through the filter assembly and heated evaporation chamber. Features of this invention include an improved removable filter assembly, an improved heat transmitting element located in the evaporator head, and an improved evaporator plate.

17 Claims, 3 Drawing Sheets

OIL RECLAMATION DEVICE

RELATED APPLICATION

This is a continuation-in-part application of U.S. Pat. Application Ser. No. 061,823 filed June 15, 1987 now abandoned.

FIELD OF THE INVENTION

This disclosure generally relates to an oil filter and reconditioning device used on internal combustion engines and to an improved device with a detachable filter canister which allows the filter canister to be easily changed. The reconditioning device can be disassembled and reassembled for easy installation and maintenance.

BACKGROUND OF THE INVENTION

This invention relates to fluid reclamation devices which are used with engines using lubricating oils and hydraulic systems to remove solid contaminates and water or other volatile contaminates from the lubricating oils or hydraulic fluids. More particularly, the invention relates to a unique evaporation plate and evaporator head and an improved filter assembly.

Oil reclamation devices of the general type disclosed and described herein are generally well known. These devices are used to remove both solid and liquid contaminates from the lubricating oil. It is well known that oil in and of itself does not "wear out". Once the solid and volatile contaminates are removed from the oil, the oil is substantially reconditioned and remains in a useful state.

A discussion of oil reclamation device is found in U.S. Department of Energy publication DOE/BC/1O256-1 Initial Assessment of Selected Advanced Lubricating Oil Filter, Sept. 1981. As part of the publication, patent and literature searches were conducted. Fifty seven patents were listed which showed filters that extract vapor from oil under vacuum and/or with added heat along with seventeen literature references.

Pertinent prior art which is specifically directed towards oil reclamation devices of the general construction of the present invention are typified by the "Engle" patents Nos. 4,289,583, 4,227,969 and 4,189,351 currently assigned to the assignee of the present invention.

U.S. Pat. No. 4,289,583 discloses an oil reclamation device with an evaporator head having a heat transmitting member mounted in a cavity in the evaporator head, an evaporator plate mounted to the evaporator head to form a baffled evaporator chamber and a filter container secured to the evaporator plate. The filter container is provided with an oil inlet valve at its bottom.

U.S. Pat. Nos. 4,227,969 and 4,189,351 disclose oil reclamation devices of a similar construction, both having a fixed filter and oil inlet positioned in the base of the filter which disburses oil upward into the filter material composition.

It is known in the art to utilize removable filters in connection with heated oil refining apparatus to remove liquid and solid contaminates from the oil used in internal combustion engines.

For example in U.S. Pat. No. 4,146,475 the fine filter and coarse filter which are used in the apparatus can be replaced by separating them from the concentric cylinder housing by unscrewing the concentric cylinder housing.

In U.S Pat. No. 4,585,924 a spin on diesel oil filter is used. The filter is constructed of conventional paper pleated construction with a base plate having a central threaded bore. The filter is screwed onto the lower threaded end of a nipple on an associated spacer which is in turn threaded at its top and screwed onto a second externally threaded nipple that is cast in and extends from the manifold.

In U.S. Pat. No. 4,369,110 the filter cartridge is provided with a perforated web having a central internal threaded opening which is screwed onto the outside of the end of a coaxial pipe which serves as an oil inlet and conduit. A needle member is screwed to the inside of the coaxial pipe and is jammed into the filter media providing a passageway for the oil into the filter cartridge.

The following patents also disclose the general state of the filter refining art: U.S. Pat. Nos. 4,388,185; 4,354,946; 4,349,438; 4,272,371; 4,261,838; 3,912,631 and 2,707,051.

Numerous disadvantages are associated with these known devices. For example, oil flows directly at a fairly high flow rate into a specific area of filter without dispersal throughout the filter container causing filter clogging and an increase in the micro size of the particles that are able to be filtered. Oil containing unvolitized contaminates will pass from the filter directly out of the oil outlet means of the container because it will not be included in any thin film traveling over the vaporizing surface on the upper side of the evaporator plate.

It is important that the oil passing across the vaporizing surface be maintained in as thin a film as possible to promote vaporization of the liquid contaminates. With other known filter refining devices, if the longitudinal axis is angularly disposed more than 5" from the vertical while installed, the oil will all flow to one side of the evaporator plate. Consequently, the effectiveness of the device will be virtually destroyed because of the depth of the oil from which the volatile contaminates can be volitilized.

None of the prior art devices are designed to effect the greatest efficiency of removing the contaminates and maintaining the operation of the device. Pressure build-up within the container causes shifting of the filter medium during operation. Inefficient transfer of heat from the heating surface to the thin film of oil is encountered because of spacing problems in the heater cavity and lack of heat conduction. Finally, the use of the known devices in marine conditions is questionable because of the open electrical connections.

Another object of the invention is to provide a removable filter cartridge in an oil reclamation device which results in a significantly controlled flow of oil being treated.

A further object of the invention is to expose substantially all of the oil to substantially uniform mechanical filtration and vaporization treatment.

A still further object of the invention is to provide an evaporator plate and evaporator head with a heat transmitting member having interacting portions which contribute to establish a uniformity in heating and fluid flow through the evaporation chamber.

It is still a further object of this invention to provide a filter assembly which will obviate problems associated with the disposition of fibrous material in the filter as it is provided in prior art oil reclamation devices.

SUMMARY OF THE INVENTION

The present inventive oil reclamation device comprises an evaporator head which includes a heat transmitting member and when secured to an evaporator plate defines an evaporation chamber. The evaporator plate is mounted to the evaporator head and includes an upper and a lower surface with the upper surface forming a vaporizing surface along which oil passes in a thin film. The lower surface faces downwardly toward the filter means. Passageway means extend from the filter through the evaporator plate and open onto the upper side of the evaporator plate to deliver oil into the evaporation chamber in a thin film along the vaporizing surface.

The invention also utilizes effecting sealing between the evaporator plate and the evaporator head to control the flow of substantially all of the oil through the center of the device and the evaporator plate and the filter housing. A portion of the inside of the evaporator head is in contact with a portion of the upper side of the evaporator plate to sealingly urge the evaporator head against the evaporator plate with a sealing gasket therebetween. The surface of the evaporator plate facing the filter includes an annularly disposed channel for receiving sealing means disposed between the evaporator plate and the filter housing. The sealing means is located along the entire periphery of the evaporator plate to prohibit by passing of the fluid between the evaporator plate and the filter housing. With the invention, fastening of the evaporator plate to the top of the filter container or canister is effected by mating the two together. This configuration necessarily controls the flow of the oil from the filter to the evaporation chamber.

When there is pressure buildup as the pumped oil enters the oil inlet and proceeds downward through the tube of the filter member into the filter medium, the filter medium tends to rise upwardly against the top portion of the filter housing. This potentially causes shifting of the filter elements within the container and could cause blockage of the evaporator plate passageways and ultimately stop the flow of oil through the device. The filter housing of this invention overcomes this potential problem with a downward projection of the top portion of the filter housing that is angularly displaced away from the bottom surface of the evaporator plate for the purpose of holding the filter medium in place and allowing free flow of oil through the filter into the evaporator plate and thus into the evaporator chamber.

The heating element of the present invention is designed to fit into the cavity formed in the evaporator head for surface to surface engagement for optimum heat conductivity.

Finally the filter assembly of the present application constitutes a significant improvement in control of the flow of oil through an oil impervious canister. A tubular member with an associated flow meter is centrally positioned disposed in the filter canister to cause the oil to pass from the inlet means outwardly by way of radially disposed holes in the tubular member to the bottom periphery of the filter medium. The oil then flows back up the canister through the filtration medium and out of the opening means located in the upper end portion into the evaporator plate passageways and into the evaporation chamber. The specific disposition of compressed cotton fiber and polypropylene fiber with an oxidation inhibitor compound which forms the filter medium greatly benefit the filtering function of the device.

BRIEF DESCRIPTION OF THE DRAWINGS

Other objects of this invention will appear in the following description and appended claims, reference being made to the accompanying drawings forming a part of the specification wherein like reference characters designate corresponding parts in the several views.

DESCRIPTION OF SPECIFIC EMBODIMENTS

The preferred embodiment and best mode of the invention is shown by FIGS. 1-6.

Figure 1:
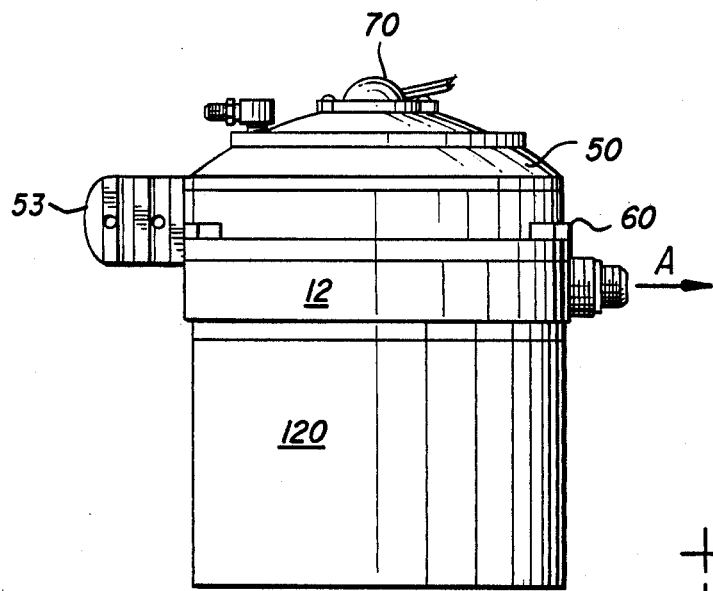
FIG. 1 shows a front elevational view of the oil reclamation device.
Figure 2:
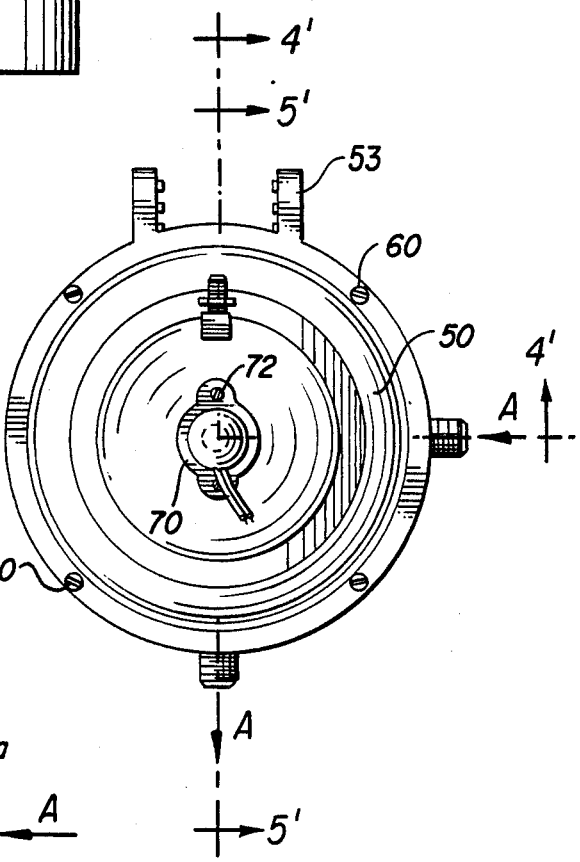
FIG. 2 shows a top plan view of the oil reclamation device.
Figure 4:
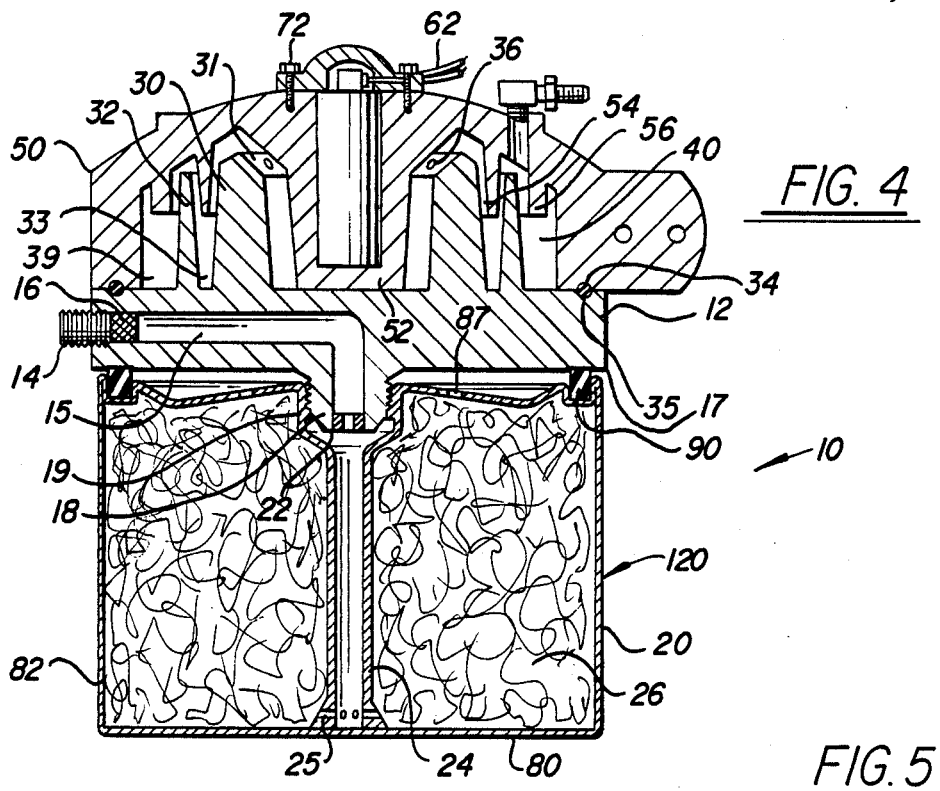
FIG. 4 shows a sectional view taken along line 4'—4' of FIG. 2.
Figure 6:
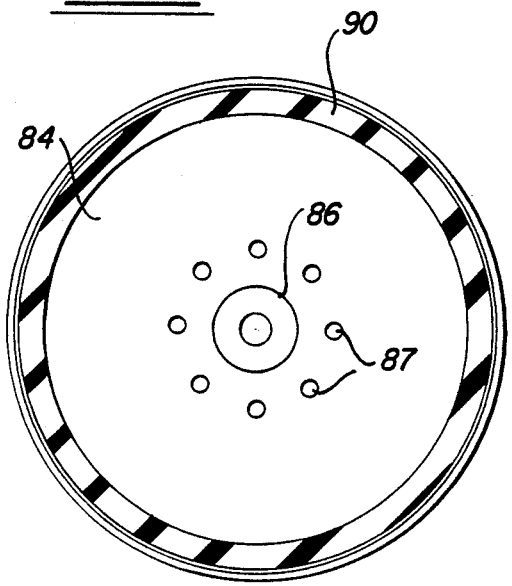
FIG. 6 shows a top plan view of the spin on filter of the device.
Figure 5:
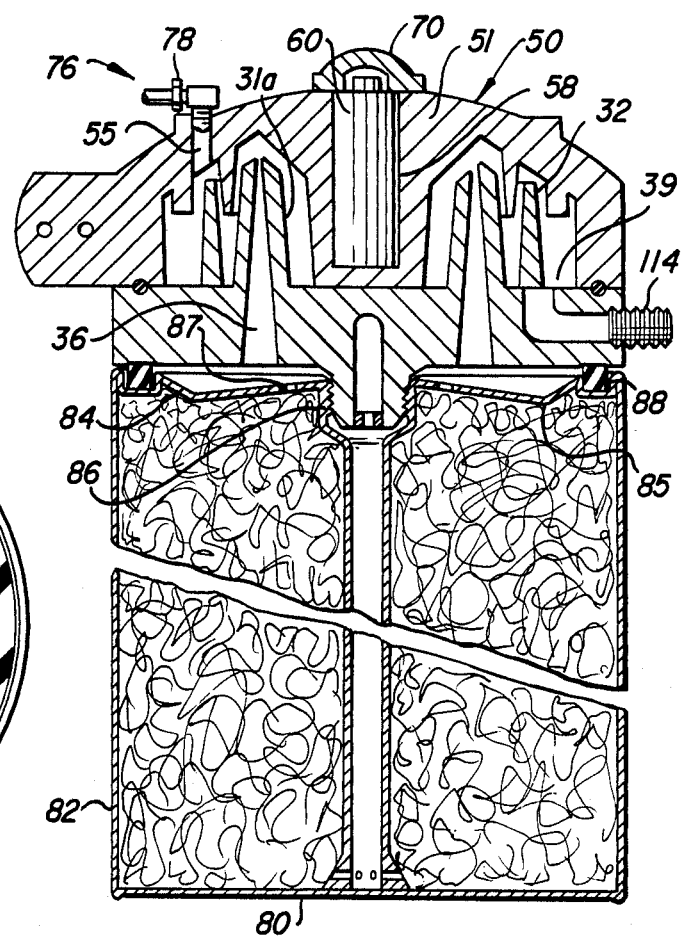
FIG. 5 shows a sectional view taken along line 5'—5' of FIG. 2.

The reclamation device, generally designated 10, and most clearly shown in FIGS. 1, 4 and 5 has a evaporator plate 12 provided with an inlet 14 and oil inlet channel or bore 15. A 40 micron screen 16 is mounted in channel 15 to provide the first filtering of oil as it enters the device. The evaporator plate 12 has an integrally formed nipple member 18 which is threaded at 19 on its exterior to receive the filter assembly housing 20. A metering jet 22 is mounted in bore 15 of the threaded nipple to direct fluid into the flow tube 24 of the filter at a predetermined rate. All of the oil received is introduced directly into the filter assembly via the flow tube 24.

A spin on filter canister 120 is mounted on the nipple 18 and defines a mechanical filtration zone which receives all of the oil coming into the reclamation device 10. The filter assembly includes compressed fibrous filter material 26 contained within the canister 120. Various conventional filter materials may be used in combination with other features of the invention as are further disclosed in the description of the invention.

Evaporator plate 12 is disposed adjacent the mechanical filtration zone defined by the filtering mechanism. Plate 12 which is constructed of a special aluminum alloy includes a plurality of integrally formed upwardly projecting sectioned evaporation walls 30 and 32 which define a plurality of curved vaporizing surfaces laterally displaced radially with respect to each other. An upwardly directed vaporizing surface 31 on the innermost annular sectioned wall 3U faces inwardly toward the center of the device. A fluid traveling surface 33 is formed between the spaced vaporizing surfaces of sectioned walls 30 and 32.

An "O" ring 34 is seated in annular channel 35 cut in the plate surface facing the evaporator head and envelopes the outer peripheral edge of plate 12. The resilient annular seal 34 is composed of a nitril rubber such as Buna-N which is an oil resistant rubber.

The fluid traveling surfaces defined between sectioned walls 30 and 32 are annular. The sectioned walls 30 and 32 form a barrier and baffle type arrangement within the evaporator chamber 40. Thus, the longest possible traveling time for the oil from the centermost portion of the evaporator plate to the oil outlet 114 is attained.

The innermost annular sectioned wall 30 surrounds heater member 52 and has a plurality of throughgoing bores 36 allowing oil to flow from the filter through the evaporator plate 12 into the evaporation chamber 40 adjacent heater member 52. As further shown in this embodiment, the initial fluid traveling surface 31 is defined along an incline extending downwardly toward the heater member 52 surface.

The bores or passageways 36 extend through plate 12 and deliver substantially all of the oil from the filter zone to a centermost surface of plate 12 bounded by wall 30 sections 30a and 30b. The passageways 36 take the form of a conical bore and extend from adjacent the mechanical filtration zone where they have their widest cross-section and open outwardly along the upwardly directed oil introducing surface 31 where they have their narrowest cross-section. Oil introducing surface 31 is inclined inwardly with respect to the centermost portion of plate 12 to direct all of the oil in a thin film downwardly over the vaporizing surface toward the heater element 60 held in member 52.

The sectioned wall 30 comprises two sections 30a and 30b divided by a fluid flow path 37 which leads into evaporation surface 33. The adjacent sectioned wall 32 also comprises two sections 32a and 32b which form two fluid flow paths 38 positioned perpendicular to the first flow path 37. The fluid flow paths 38 lead to evaporator plate surface 39 which communicates with outlet 114. This configuration is most clearly shown by FIG. 3 of the drawings.

Nuts or screws 60 or any suitable fastening means known in the art are used to join evaporator head 50 and evaporator plate 12 together.

The evaporator head 50 which is constructed of a special aluminum alloy includes a heat transmitting member 52 disposed on one side facing the evaporator plate and a heat member retainer cavity 58 formed in the opposite side. Heat transmitting member 52 is disposed adjacent the center surface of evaporator plate 12 and engages the plate surface. The evaporator head 50 in addition to having downwardly projecting member 52 has downwardly projecting heating wall members 54 and 56 which define a plurality of curved heating surfaces. Wall member 54 is located between the sectioned evaporator plate walls 30 and 32 and wall member 56 is located outside of evaporator wall 32.

The heating wall members 52, 54 and 56 of the evaporator head and the evaporation plate walls 30 and 32 define a plurality of curved paths along the fluid traveling surface from the longitudinal center axis outwardly along the evaporator plate 12. Thus, the evaporator plate sectioned walls 30 and 32 and the evaporator head heating wall members 52, 54 and 56 provide a structural configuration effective to guide the oil from the centermost portion of plate 12 outwardly along the curved paths to the oil outlet 114.

The evaporator head 50 defines the heating wall members 52, 54 and 56, on the side facing the evaporator plate, and a cavity 58 on the other or cap side receives the heating element 60. The heating element 60 is constructed of stainless steel for longevity and safety and is connected directly to a power source not shown by the electrical leads 62. The heating element 60 and cavity 58 are both constructed to get as snug a fit as possible to provide surface to surface contact between the heating element 60 and inside wall of the cavity 58 for conducting heat through the evaporator head to maintain a proper temperature in the evaporation chamber 40 to accelerate vaporization of fuel and water from the oil.

A cap member 70 is mounted to the outer surface of the evaporator head to cover cavity 58 and the heating element 60 mounted therein and maintains the heating element in a hermetically sealed environment. The cap member 70 is provided with an aperture which allows electric lead wires 62 to engage the heating element. Screws or machine bolts 72 are used to interconnect the cap member 70 to the evaporator head in a well known fashion. An appropriate ring gasket 34 can be placed between the abutting surfaces of the evaporator plate and evaporator head to accomplish the desired sealing results if such is required. A vent assembly 76 having a fitting 78 is mounted to a vent bore 55 cut in the evaporator head and is used to allow vapors to escape from the evaporation chamber 40 during the operation of the reclamation device 10.

The heat transmitting center member 52 of the evaporator head extends downwardly within the evaporation chamber 40 and is substantially surrounded by the innermost annular sectioned wall 30. Center member 52 defines a heating surface located adjacent and facing outwardly toward the inwardly facing vaporizing surface 31 of sectioned wall 30. Center member 52 seats on the flat surface of the evaporator plate defined between the inner surface of sectioned wall 30. The remaining fluid transmitting sectioned wall 32 also is in contact with the heated fluid traveling along surface 37. By this configuration, heat is transmitted via convection and conduction within the evaporation chamber.

The evaporator head 50 also includes an upper curved body 51 from which the annular walls 54 and 56 extend. Bracket members 53 are integrally formed to the body 51 and extend outward to form mounting ears for the reclamation device.

The downwardly extending annular wall 54 prevents the condensation of vaporized material inside the evaporation chamber. All of the vaporized contaminates are forced through the single evacuation bore 55 located adjacent the vapor vent outlet. Thus the vapors are quickly and efficiently ducted out before they can recondense, as occurs inside an engine crankcase. Annular wall 54 is sufficiently long to prevent the vaporized volatiles from flowing back into the engine. Wall 56 also maintains the fluid flow of oil down the evaporation wall members of the evaporator plate 12.

Figure 3:
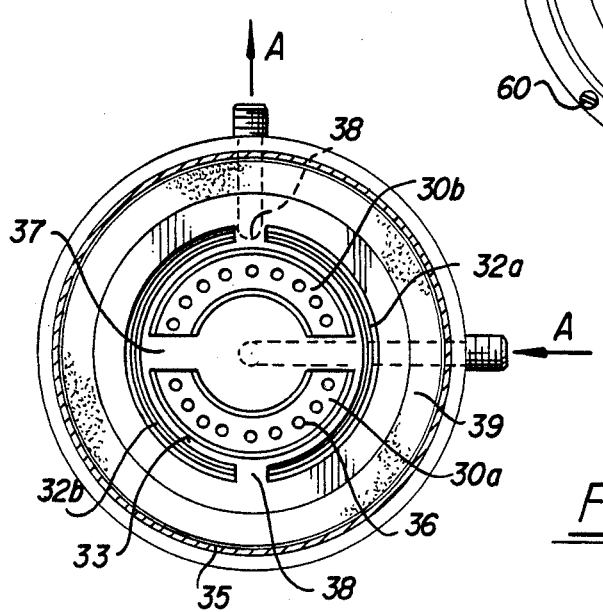
FIG. 3 shows a top plan view of the evaporator plate with the evaporator plate removed.

Evaporator plate 12 is provided with a vaporizing surface 31a disposed upwardly and facing inwardly toward center member 52. Oil moves through the conical bores or passageways 36 and flows in a thin film downwardly along vaporizing surface 31 and 31a toward the fluid flow path 37 located between the radially disposed annular sectioned walls 30a and 30b as shown in FIG. 3. While the oil is in a thin film, the heat transmitted from center member 52 vaporizes the volatile contaminates such as water and fuel which have become entrapped in the lubricating oil during its use. Because of the thin film, water will evaporate at less than 212° F. and fuel will evaporate at less than flash point.

The filter side of evaporator plate 12 includes an annularly configured channel seat 17 for receiving a sealing member or gasket 90 disposed between evaporator plate 12 and the filter assembly. Sealing member 90 is located along the entire periphery of evaporator plate 12 to prohibit the bypassing of fluids between plate 12 and the canister 120.

The oil discharging mechanism of the filter is located in the upper end portion 84 of canister 120. The upper end portion is formed with a recessed configuration 85 and a threaded central female receptacle 86 which receives evaporator plate nipple 18 to hold the filter in place on the evaporator plate. The upper end portion or cover plate member 84 is also crimped at its periphery to form a seal channel 88 which holds sealing member 90 in place together with channel seat 17 of the evaporator plate. Spaced radial openings 87 located in the upper end portion 84 enable all of the oil to be directed from the filter into an oil receiving chamber and from there toward the passageways or channel means 36 into the evaporation chamber 40.

The unique filter assembly of this embodiment includes a removable filter canister 120 in which fibrous filter material such as long strand cotton fiber material is compressed under pressure of up to 7000 pounds per square inch. The cotton material absorbs sulfur thereby neutralizing acids which paper cannot do. It is also envisioned that plastic fibers be mixed with the cotton fibers to provide an anti oxidant when the oil is broken down by heat shear or that the cotton fibers can be impregnated with an oxygen inhibitor. Oxidation of oil can produce thickening and lead to inadequate lubrication. The oxidation of the oil results from the reaction of oil at high temperature with oxygen. A single molecule of oxygen can initiate a series of reactions involving peroxides which result in the oxidation of hydrocarbon molecules. Thus an oxygen inhibitor such as calcium phenate, any of a group of hindered phenols, such as an overbased sulfonate, or aromatic amine is imbedded in polypropylene or suitable plastic strands that will melt at a predetermined temperature releasing the oxidation inhibitors which will immediately function to reduce oxidation. Canister 120 has a bottom end portion 80, a side wall portion 82 and an upper end portion 84. It is constructed of a material that is impervious to fluids.

FIGS. 4 and 5 show the device 10 sectionally with the flow of oil indicated by arrow A. Oil enters oil inlet 14, passes down passageway 15, is metered by flow meter 22 and continues flowing down center tube 24 of the spin on filter 120. The oil exits center tube through outlets 25 so that it is discharged laterally along the bottom end portion 80 and is forced upward through fibrous material 26 thereby removing particles down to one micron diameter from the oil. The metering jet 22 in center tube 24 slows the oil flow to a measured flow rate thus permitting maximum retention by the fibrous material of solid contaminants such as carbon, varnish, gums, metal particles, sludge, silica and dirt. The oil continues upward through the holes 87 of the top section 84 and then rises through sectioned wall 30 via holes 36. The oil flows down into the circular area defined by wall sections 30a and 30b into an annular area 33 defined by wall sections 32a and 32b and out into exit tube 114.

Heater 60 heats evaporator head 50 and causes the oil to vaporize out the liquid impurities as it travels around the respective walls and chamber areas previously enumerated.

Spin on filter 120 is attached to evaporator head 12 by threadably mounting nipple 18 into receiving socket 86 of the spin on filter.

FIG. 3 shows the top plan view of the evaporator plate 12 with the evaporator head removed.

Bolts 60 tighten the evaporator head 50 downwardly onto the upper peripheral edge of the evaporator plate 12. The seal 90 has been previously positioned by screwing the canister 120 to the evaporator plate nipple. Once the bolts 60 are tightened, the various parts of the device are firmly in place and the resultant controlled flow of oil through the reclamation device 10 provides the greatest amount of filtration and evaporation of contaminates.

OPERATION OF THE APPARATUS

In operation the impure oil containing impurities such as carbon, dirt, silica, water, sulphuric acid ($H_2SO_4$), fuel and the like enters the oil refiner 10 by way of oil inlet 14 through a 40 micron screen 16 and plate channel 15 into the metering jet 22. The metering jet 22 regulates the rate of flow of the fluid along the filter tube 24 and out circumferentially positioned holes 25 in the tube 24 at the bottom of the filter into the filtering media 26. Due to the pressure maintained by the oil pump of the internal combustion engine the oil works its way up through the filtering media 26 through the apertures 87 of the filter perforation plate 84 up passageways 36 of the evaporator plate into the vaporization chamber 40. The solid impurities such as dirt, silica, dust and carbon particles have been captured by the micron screen 16 and filtering media 26 respectively. Since the oil and liquid contaminates have different densities, the two became separate as they engage the heated chamber walls and pass over the various baffles formed by those walls. The liquid contaminates such as water, fuel and sulphuric acid vaporize and are carried off by vent 78. The walls 30, 32, 52, 54 and 56 in the evaporation chamber work as baffles and change the direction of the vapor and liquid carrying air causing the oil vapor to fall down and condense into the sectioned areas of the chamber due to the force of gravity and finally exit via the oil outlet 114 to the crank case for reuse as a lubricant. This is a continuous process which removes the solid and liquid contaminates on each cycling of the oil. Thus the system allows a greater time and mileage interval between oil changes, improves gas mileage and insures continuous removal of liquid as well as solid contaminants.

Figure 7:
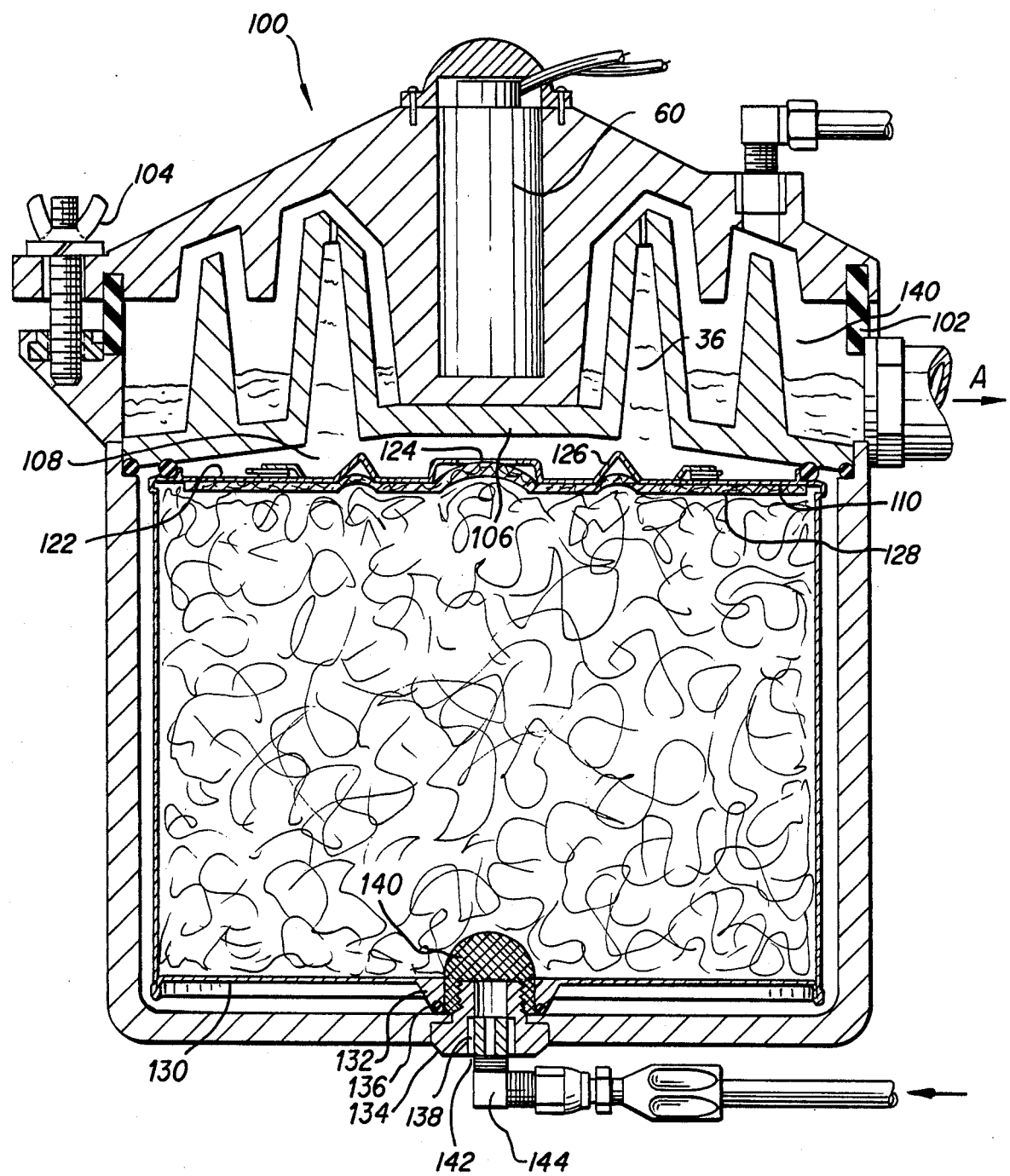
FIG. 7 shows an enlarged cross sectional view of alternate embodiment of the invention.

An alternate embodiment of the invention 100 is shown in FIG. 7.

This embodiment uses an evaporator head and evaporator plate constructed similarly to the preferred embodiment The evaporator head uses a larger gasket seal 102 and is secured to the evaporator plate with wing nuts 104. In this embodiment the brackets 53 are deleted.

The evaporator plate also differs from the preferred embodiment in that the filter facing surface 106 is recessed or domed inward to provide a larger chamber 108 for oil which has exited the top 110 of the filter.

The filter 120 has an upper portion 122 having a central aperture 124, an annular rib or protrusion 126 and a felt pad 128 which is mounted against the underside of the upper portion 122 and bulges from the force of the oil pressure into the aperture area and the annular protrusion area.

The bottom portion 130 of the filter has a single inlet opening in an indentation 132 specifically fitted over the shaped bushing 134. The shaped bushing is held in place by "O" ring 136 and holds a metering jet 138 which controls the flow of contaminated oil entering the filter. A filter basket 140 is mounted over the inlet port 142 to catch and retain particles which were not caught by strainer 144 before entering the inlet part. The oil is forced upward by pressure through the aperture 124 into the preliminary collection chamber 108 for transportation through passageways 36 into the evaporation chamber 140 where the oil is heated and evaporated in the same manner as previously discussed.

While the description of the invention and the operation has been addressed in terms of oil purification, the term oil could emphasize hydraulic fluid or any other lubrication or fluid which requires cleaning to maintain its original purpose and effectiveness.

While the oil reclamation device has been shown and described in detail, it is obvious that this invention is not to be considered as being limited to the exact form disclosed, and that changes in detail and construction may be made therein, within the scope of the invention, without departing from the spirit thereof.

What we claim is:

1. A fluid reclamation device for filtering solid and liquid impurities from fluid comprising;
   a removable filter assembly comprising a housing including a cylindrical body and a bottom wall secured to said cylindrical body, a fluid distribution tube mounted in said housing, a cover plate member with attachment means and fluid passageway means secured to said cylindrical body, and cotton fiber filter means contained in said cylindrical body positioned around said fluid distribution tube, said cotton fiber filter means including a plastic fiber containing an oxygen inhibitor, said plastic fiber breaking down at a predetermined temperature to release said oxygen inhibitor;
   an evaporator plate mounted to said cover plate member attachment means, with opposing surfaces of said evaporator plate and mounted cover plate member forming an oil receiving chamber;
   fluid inlet means including a throughgoing channel formed in the evaporator plate in fluid communication with the fluid distribution tube allowing fluid to be distributed into said filter body;
   an evaporator head mounted to the evaporator plate by fastening means forming an evaporation chamber between the evaporator head and the evaporator plate for receiving fluid from the filter body through the fluid passageway means of the cover plate member into the oil receiving chamber and circulating the fluid in the evaporation chamber;
   a heater means mounted in said evaporator head having a surface to surface engagement with the evaporator head for heating the fluid circulating in the evaporation chamber causing evaporation of liquid impurities in the fluid, vent means mounted to said evaporator head for discharging the evaporated impurities and a fluid outlet means leading from the evaporation chamber for discharging filtered fluid.

2. A fluid reclamation device as claimed in claim 1, wherein said cover plate member attachment means is a threaded female member centrally positioned on the cover plate member and said evaporator plate includes mounting means comprising a threaded nipple extending from said evaporator plate, said threaded female member being connected to and in fluid communication with said fluid distribution tube.

3. A fluid reclamation device as claimed in claim 1, wherein the filter assembly includes a sealing gasket positioned on a gasket seat defined on the cover plate member for engagement with said evaporator plate to provide a leakproof seal between the filter assembly and the evaporator plate.

4. A fluid reclamation device as claimed in claim 1 wherein said fluid distribution tube defines a central bore and a plurality of radial throughgoing bores extending through the tube from the central bore to the exterior of the tube, said fluid distribution tube having a distal end that is flared outward and engages the bottom wall of the filter housing.

5. A fluid reclamation device as claimed in claim 1 wherein said evaporator plate comprises a body with a circular configuration and a threaded nipple member which extends outwardly from the evaporator plate body, the center axis of said nipple member being axially aligned with the center of said circular evaporator plate, said throughgoing channel of said fluid inlet means extending through the center of said nipple member allowing fluid to flow along said inlet channel through said nipple member.

6. An oil reclamation device for filtering solid and liquid impurities from oil comprising;
   a threaded cylindrical filter canister comprising a casing with a central oil filter tube mounted therein, one endwall of said casing defining a perforated plate with a female receptacle means, a proximal end of said oil filter tube mounted to said female receptacle means, the distal end of said oil filter tube being positioned proximate the other end wall of said casing and filter material packed in said casing;
   an evaporator plate with an integral nipple means removably mounted to said perforated plate female receptacle means with opposing surfaces of said evaporator plate and perforated plate defining an oil receiving chamber,
   oil inlet means comprising a channel formed in the evaporator plate which is in fluid communication with the central oil filter tube;
   an evaporator head mounted to the evaporate plate and forming a baffled evaporation chamber between the evaporator head and the evaporator plate for receiving oil from the oil receiving chamber after it has passed through the filter canister and circulating the oil in the evaporation chamber;
   heater means mounted in a cavity formed in said evaporator head having a surface to surface engagement with the evaporator head for heating the oil circulating in the evaporation chamber to evaporate liquid impurities from the oil, cap means covering said heater means and the cavity formed in said evaporator head, vent means for discharging the evaporated impurities from the evaporation chamber and an oil outlet means communicating with the evaporation chamber for discharging filtered oil.

7. An oil reclamation device as claimed in claim 6 including screen means mounted in said oil inlet means.

8. An oil reclamation device as claimed in claim 7 where said screen means is at least a 50 micron screen.

9. An oil reclamation device as claimed in claim 6 wherein said evaporator plate and evaporator head have annular channels which are of the same diameter and receive "O" ring means.

10. An oil reclamation device as claimed in claim 6 wherein the distal end of said central oil filter tube is provided with a plurality of bores radially projecting from the oil filter tube.

11. An oil reclamation device as claimed in claim 6 wherein said filter material contains plastic fibers containing an oxygen inhibitor.

12. An oil reclamation device as claimed in claim 11 wherein said oxygen inhibitor is one or more compounds selected from the group consisting of hindered phenols and aromatic amines.

13. An oil reclamation device as claimed in claim 11 wherein said oxygen inhibitor is a calcium phenate.

14. An oil reclamation device as claimed in claim 6 including flow meter means mounted in said evaporator plate channel to regulate fluid flow through said evaporator plate channel.

15. A fluid reclamation device for filtering solid and liquid impurities from fluid comprising;
   a removable filter assembly comprising a housing including a cylindrical portion and a bottom wall secured to said cylindrical portion, a fluid inlet tube mounted in said housing, a perforated plate means defining fluid passage means secured to said cylindrical portion and attachment means secured to said perforated plate means, said perforated plate attachment means comprising a threaded female socket member centrally positioned on said perforated plate means and connected to said fluid inlet tube;
   an evaporator plate with securing means, said evaporator plate securing means engaging said perforated plate attachment means to hold said filter assembly in a spaced relationship to said evaporator plate;
   fluid inlet means formed in the evaporate plate in fluid communication with the fluid inlet tube;
   an evaporator head mounted to the evaporator plate by fastening means forming an evaporation chamber between the evaporator head and the evaporator plate for receiving fluid from the filter assembly through the perforated plate means and circulating the fluid in the evaporation chamber;
   a heater means mounted in said evaporator head having a surface to surface engagement with the evaporator head for heating the fluid circulating in the evaporation chamber causing vaporization of liquid impurities in the fluid, said heater means having a cylindrical configuration and the evaporator head defining a matching cylindrical aperture for receiving the heater means, said evaporator head being provided with cap and fastener means mounted thereto for hermetically sealing the heater means in the cylindrical aperture, and vent means mounted to said evaporator head for discharging the evaporated impurities from said evaporation chamber and a fluid outlet means leading from the evaporation chamber for discharging filtered fluid.

16. An oil reclamation device for filtering solid and liquid impurities from oil comprising;
   an evaporator head, an evaporator plate removably mounted to said evaporator head forming a baffled evaporation chamber between the evaporator head and the evaporator plate, said evaporator plate defining passage means and having a concave surface, a filter assembly mounted to said evaporator plate forming an oil receiving chamber between the concave surface of said evaporator plate and said filter assembly, said oil receiving chamber receiving pressurized oil from said filter assembly, said oil then flowing into the evaporation chamber by way of said passage means;
   said filter assembly comprising a housing, an oil inlet means mounted to one end of said housing and a perforated plate with channel means defined therein mounted on the other end of said housing;
   a heater mounted in a heater chamber formed in said evaporator head for surface to surface engagement with the evaporator head, a removable cap means mounted over said heater chamber and heater mounted therein to keep said heater in a hermetically sealed condition, said heater being adapted to heat oil circulating in the evaporator chamber causing evaporation of liquid impurities in the oil, vent means mounted in said evaporator head for discharging the evaporated impurities from the evaporation chamber and an oil outlet means leading form the evaporation chamber for discharging filtered oil.

17. An oil reclamation device for filtering solid and liquid impurities from oil comprising;
   an evaporator head, an evaporator plate removably mounted to said evaporator head forming a baffled evaporation chamber between the evaporator head and the evaporator plate, a filter assembly mounted to said evaporator plate, said evaporator plate defining passage means and having a concave lower surface forming an oil receiving chamber between said evaporator plate and said filter assembly to receive oil from said filter assembly, said oil then flowing from said oil receiving chamber into the evaporation chamber by way of said passage means;
   said filter assembly comprising a housing, an oil inlet means mounted to one end of said housing, a cover plate mounted on the other end of said housing, said cover plate defining aperture means and annular rib means, said annular rib means serving to limit expansion of the cover plate into the oil receiving chamber and provide for continuous oil flow.

* * * * *